US008080199B2

(12) United States Patent
Tour et al.

(10) Patent No.: US 8,080,199 B2
(45) Date of Patent: Dec. 20, 2011

(54) INTERACTION OF MICROWAVES WITH CARBON NANOTUBES TO FACILITATE MODIFICATION

(75) Inventors: James M. Tour, Bellaire, TX (US); Christopher A. Dyke, Humble, TX (US); Jason J. Stephenson, McLean, VA (US); Boris I. Yakobson, Houston, TX (US)

(73) Assignee: William Marsh Rice University, Houston, TX (US)

( * ) Notice: Subject to any disclaimer, the term of this patent is extended or adjusted under 35 U.S.C. 154(b) by 401 days.

(21) Appl. No.: 11/840,422

(22) Filed: Aug. 17, 2007

(65) Prior Publication Data

US 2008/0169061 A1    Jul. 17, 2008

Related U.S. Application Data

(63) Continuation of application No. 10/738,168, filed on Dec. 17, 2003, now abandoned.

(60) Provisional application No. 60/434,147, filed on Dec. 17, 2002.

(51) Int. Cl.
    *B29C 35/08* (2006.01)
(52) U.S. Cl. .................. 264/494; 264/490; 204/157.43; 204/157.47
(58) Field of Classification Search .................. 264/490, 264/494; 204/157.43, 157.47
    See application file for complete search history.

(56) References Cited

U.S. PATENT DOCUMENTS

| | | | |
|---|---|---|---|
| 3,755,519 A | 8/1973 | Myers et al. | |
| 3,974,110 A * | 8/1976 | Patchornik et al. | ........... 525/152 |
| 6,156,256 A * | 12/2000 | Kennel | ........................... 264/461 |
| 6,245,849 B1 * | 6/2001 | Morales et al. | ............... 524/442 |
| 6,641,961 B2 | 11/2003 | Takebe et al. | |
| 6,764,628 B2 * | 7/2004 | Lobovsky et al. | ....... 264/172.15 |
| 6,899,945 B2 | 5/2005 | Smalley et al. | |
| 7,108,841 B2 | 9/2006 | Smalley et al. | |
| 2002/0020832 A1 | 2/2002 | Oka et al. | |
| 2003/0042128 A1 * | 3/2003 | Harutyunyan et al. | .... 204/158.2 |

FOREIGN PATENT DOCUMENTS

| | | |
|---|---|---|
| FR | 2555188 | 5/1985 |
| JP | 5-170873 | 7/1993 |
| WO | WO 01/75903 | 10/2001 |

OTHER PUBLICATIONS

Nonotubes in Microwave Fields: Light Emission, Intense Heat, Outgassing, and Reconstruction T.J. Imholt et al.*
U.S. Appl. No. 60/511,285, Ericson, et al.
Iijima, "Helical microtubules of graphite carbon", Nature, 354 (1991), pp. 56-58.

(Continued)

*Primary Examiner* — Joseph Del Sole
*Assistant Examiner* — David N Brown, II
(74) *Attorney, Agent, or Firm* — Winstead PC

(57) ABSTRACT

The present invention is directed toward methods of crosslinking carbon nanotubes to each other using microwave radiation, articles of manufacture produced by such methods, compositions produced by such methods, and applications for such compositions and articles of manufacture. The present invention is also directed toward methods of radiatively modifying composites and/or blends comprising carbon nanotubes with microwaves, and to the compositions produced by such methods. In some embodiments, the modification comprises a crosslinking process, wherein the carbon nanotubes serve as a conduit for thermally and photolytically crosslinking the host matrix with microwave radiation.

22 Claims, 3 Drawing Sheets

OTHER PUBLICATIONS

Iijima, et al., "Single-shell carbon nanotubes of 1 nm diameter", Nature, 363 (1993), pp. 603-605.
Bethune, et al., "Cobalt-catalysed growth of carbon nanotubes", Nature, 363 (1993), pp. 605-607.
Ebbesen, "Carbon Nanotubes", Ann. Rev. Mater. Sci., 24 (1994), pp. 235-264.
Zhou, et al., "Materials Science of Carbon Nanotubes: Fabrication, Integration, and Properties of Macroscopic Structures of Carbon Nanotubes", Acc. Chem. Res., 35 (2002), pp. 1045-1053.
Dai, "Carbon Nanotubes: Synthesis, Integration, and Properties", Acc. Chem. Res., 35 (2002), pp. 1035-1044.
Yakobson, et al., "Fullerene Nanotubes: C1,000,000 and Beyond", American Scientist, 85 (1997), pp. 324-337.
Ajayan, "Nanotubes from Carbon", Chem. Rev., 99 (1999), pp. 1787-1799.
Baughman, et al., "Carbon Nanotubes—the Route Toward Applications", Science, 297 (2002), pp. 787-792.
Thess, et al., "Crystalline Ropes of Metallic Carbon Nanotubes", Science, 273 (1996), pp. 483-487.
Hone, et al., "Electrical and thermal transport properties of magnetically aligned single wall carbon nanotube films", Appl. Phys. Lett., 77 (2000), pp. 666-668.
Yu, et al., "Tensile Loading of Ropes of Single Wall Carbon Nanotubes and their Mechanical Properties", Phys. Rev. Lett., 84 (2000), pp. 5552-5555.
Mitchell, et al., "Dispersion of Functionalized Carbon Nanotubes in Polystyrene", Macromolecules, 35 (2002), pp. 8825-8830.
Thostenson, et al., "Advances in the science and technology of carbon nanotubes and their composites: a review", Composites Sci. & Tech., 61 (2001), pp. 1899-1912.
Zhan, et al., "Single-wall carbon nanotubes as attractive toughening agents in aluminum based nanocomposites", Nature Materials, 2 (2003), pp. 38-42.
Ajayan, et al., "Nanotubes in a Flash—Ignition and Reconstruction", Science, 296 (2002), p. 705.
Bockrath, et al., "Igniting Nanotubes with a Flash" Science, 297 (2002), pp. 192-193.
Imholt, et al., "Nanotubes in Microwave Fields: Light Emission, Intense Heat, Out-Gassing and Reconstruction", Chem. Mater. 15 (2003), pp. 3969-3970.
Liu, et al., "Fullerene Pipes", Science, 280 (1998), pp. 1253-1256.
Chen, et al., "Solution Properties of Single-Walled Carbon nanotubes", Science, 282 (1998), pp. 95-98.
Khabashesku, et al., "Fluorination of Single-Wall Carbon Nanotubes and Subsequent Derivatization Reactions", Acc. Chem. Res., 35 (2002), pp. 1087-1095.
Sun, et al., "Functionalized Carbon Nanotubes: Properties and Applications", Acc. Chem. Res., 35 (2002), pp. 1096-1104.
Holzinger, et al., "Sidewall Functionalization of Carbon Nanotubes", Angew. Chem. Int. Ed., 40 (2001), pp. 4002-4005.
Bahr, et al., "Covalent chemistry of single-wall carbon nanotubes", J. Mater. Chem., 12 (2002), pp. 1952-1958.
Gu, et al., "Cutting Single-Wall Carbon Nanotubes through Fluorination", Nano Letters, 2 (2002), pp. 1009-1013.
O'Connell, et al., "Reversible water-solubilization of single-walled carbon nanotubes by polymer wrapping", Chem. Phys. Lett., 342 (2001), pp. 265-271.
Dyke, et al., "Solvent-Free Functionalization of Carbon Nanotubes", J. Am. Chem. Soc., 125 (2003), pp. 1156-1157.
Dyke, et al., "Unbundled and Highly Functionalized Carbon Nanotubes from Aqueous Reactions", Nano Lett., 3 (2003), pp. 1215-1218.
Rinzler, et al., "Large-Scale Purification of Single-Walled Carbon Nanotubes: Process, Product, and Characterization", Appl. Phys. A, 67 (1998), pp. 29-37.
Zimmerman, et al., "Gas-Phase Purification of Single-Wall Carbon Nanotubes", Chem. Mater., 12 (2000), pp. 1361-1366.
Chiang, et al., "Purification and Characterization of Single-Wall Carbon nanotubes", J. Phys. Chem. B, 105 (2001), pp. 1157-1161.
Chiang, et al., "Purification and Characterization of Single-Wall Carbon Nanotubes (SWNTs) Obtained from the Gas-Phase Decomposition of CO (HiPco Process)", J. Phys. Chem. B, 105 (2001), pp. 8297-8301.
Farkas, et al., "Length sorting cut single wall carbon nanotubes by high performance liquid chromatography", Chem. Phys. Lett., 363 (2002), pp. 111-116.
Chattopadhyay, et al., "A Route for Bulk Separation of Semiconducting from Metallic Single-Wall Carbon nanotubes", J. Am. Chem. Soc., 125 (2003), 3370-3375.
Bachilo, et al., "Structure-Assigned Optical Spectra of Single-Walled Carbon Nanotubes", Science, 298 (2002), 2361-2366.
Strano, et al., "Electronic Structure Control of Single Walled Carbon Nanotube Functionalization", Science, 301 (2003), pp. 1519-1522.
Davis, et al., "Phase Behavior and Rheology of SWNTs in Superacids", Macromolecules, 37 (2004), pp. 154-160.
Nikolaev, et al., "Gas-Phase Catalytic Growth of Single-Walled Carbon Nanotubes from Carbon Monoxide", Chem. Phys. Lett., 313 (1999), pp. 91-97.
Palstra, et al., "Electric current induced light emission from C60", Carbon, 35 (1997), pp. 1825-1831.
Pradhan, et al., "Large cryogenic storage of hydrogen in carbon nanotubes at low pressures", J. Mater. Res., 17 (2002), pp. 2209-2216.
Ma, et al., "Hydrogen storage capacity in single-walled carbon nanotubes", Phys. Rev. B., 65 (2002), #155430 (6 pages).
Gundiah, et al., "Hydrogen storage in carbon nanotubes and related materials", J. Mater. Chem., 13 (2003), pp. 209-213.
Gordillo, et al., "Zero-Temperature Equation of State of Quasi-One-Dimensional H2", Phys. Rev. Lett., 85 (2000), pp. 2348-2251.
Baghurst, et al., "Superheating Effects Associated with Microwave Dielectric Heating", J. Chem. Soc., Chem. Commun., 6 (1992), p. 674-677.
Terrones, et al., "Molecular Junctions by Joining Single-Walled Carbon Nanotubes", Phys. Rev. Lett., 89 (2002), #075505 (8 pages).
Tsai, et al., "The welding of carbon nanotubes", Carbon, 38 (2000), pp. 1899-1902.
Zhao, et al., "Dynamic Topology of Fullerene Coalescence", Phys. Rev. Lett., 88 (2002), #185501 (4 pages).
Zhao, et al., "Coalescence of fullerene cages: Topology, energetics, and molecular dynamics simulation", Phys. Rev. B, 66 (2002), #195409 (9 pages).
Jiang, et al., "Nanotechnology: Spinning continuous carbon nanotube yarns", Nature, 419 (2002), p. 801.
Baughman, et al., "Carbon Nanotubes—the Route Toward Applications", Science, 297 (2002), pp. 787-792.
Yarlagadda, "Study on Microwave Dielectric Properties of Epoxy Resin Mixtures Used for Rapid Product . . . ", Acta Metallurgica Sinica (English Letters), 14 (2001), pp. 1-12.

* cited by examiner

INTERACTION OF MICROWAVES WITH CARBON NANOTUBES TO FACILITATE MODIFICATION

CROSS REFERENCE TO RELATED APPLICATIONS

The present application is a Continuation of U.S. patent application Ser. No. 10/738,168 filed Dec. 17, 2003, which in turn claims priority to U.S. Provisional Application Ser. No. 60/434,147, filed Dec. 17, 2002. Both applications are incorporated by reference herein in their entirety.

STATEMENT OF FEDERALLY FUNDED RESEARCH

This invention was made with government support under NASA Grant No. JSC-NCC-9-77, awarded by the National Aeronautics and Space Administration; URETI Grant No. NCC-010203, also awarded by the National Aeronautics and Space Administration; Grant No. DMR-0073046, awarded by the National Science Foundation; and the Air Force Office of Scientific Research, Grant No. F49620-01-1-0364, awarded by the U.S. Department of Defense. The government has certain rights in the invention.

BACKGROUND OF THE INVENTION

Since the discovery of carbon nanotubes in 1991 [Iijima, "Helical microtubules of graphitic carbon," Nature, 354, pp. 56-58, 1991] and single-wall carbon nanotubes in 1993 [Iijima et al., "Single-shell carbon nanotubes of 1-nm diameter," Nature, 363, pp. 603-605, 1993; Bethune et al., "Cobalt-catalysed growth of carbon nanotubes," Nature, 363, pp. 605-607, 1993], a substantial amount of research has been carried out involving the synthesis, chemistry, and manipulation of these novel materials. See Ebbesen, "Carbon Nanotubes," Annu. Rev. Mater. Sci., 24, pp. 235-264 (1994); Zhou et al., "Materials Science of Carbon Nanotubes: Fabrication, Integration, and Properties of Macroscopic Structures of Carbon Nanotubes," Acc. Chem. Res., 35(12), pp. 1045-1053 (2002); Dai, "Carbon Nanotubes: Synthesis, Integration, and Properties," Acc. Chem. Res., 35(12), pp. 1035-1044 (2002). The goal of much of this research is to facilitate the exploitation of carbon nanotubes' intriguing properties. See Yakobson et al., "Fullerene Nanotubes: $C_{1,000,000}$ and Beyond," American Scientist, 85, pp. 324-337 (1997); Ajayan, "Nanotubes from Carbon," Chem. Rev., 99, pp. 1787-1799 (1999); Baughman et al., "Carbon Nanotubes—the Route Toward Applications," Science, 297, pp. 787-792 (2002).

Some of the properties of carbon nanotubes that researchers are desirous of exploiting are found most optimally in an exemplary type of carbon nanotube: the single-wall carbon nanotube. Single-wall carbon nanotubes have the highest conductivity of any known fiber [Thess et al., Science, "Crystalline Ropes of Metallic Carbon Nanotubes," 273, pp. 483-487 (1996)], a higher thermal conductivity than diamond [Hone et al., "Electrical and thermal transport properties of magnetically aligned single wall carbon nanotube films," Appl. Phys. Lett., 77, pp. 666-668 (2000)], and the highest stiffness of any known fiber [Yu et al., "Tensile Loading of Ropes of Single Wall Carbon Nanotubes and their Mechanical Properties," Phys. Rev. Lett., 84, pp. 5552-5555 (2000)]. A great deal of research has been conducted to exploit their unique mechanical, electrical, and thermal properties to create multifunctional composite materials comprising carbon nanotubes, and single wall carbon nanotubes in particular. See Mitchell et al., "Dispersion of Functionalized Carbon Nanotubes in Polystyrene," Macromolecules, 35, pp. 8825-8830 (2002); Thostenson et al., "Advances in the science and technology of carbon nanotubes and their composites: a review," Composites Sci. & Tech., 61, pp. 1899-1912 (2001); Zhou et al., "Single-wall carbon nanotubes as attractive toughening agents in aluminum based nanocomposites," Nature Materials, 2, pp. 38-42 (2003).

Carbon nanotubes have also been shown to have unexpected interactions with electromagnetic radiation. Recently, a surprising feature has been the ignition of nanotubes in the presence of an ordinary camera flash. See Ajayan et al., "Nanotubes in a Flash—Ignition and Reconstruction," Science, 296, p. 705 (2002); Bockrath et al., "Igniting Nanotubes with a Flash," Science, 297, pp. 192-193 (2002). Nanotubes will also ignite when exposed to microwaves in air. See Imholt et al., "Nanotubes in Microwave Fields: Light Emission, Intense Heat, Out-Gassing and Reconstruction," Chem. Mater. 15, pp. 3969-3970 (2003). Methods that would exploit these interactions in an effort to produce engineered materials would be of tremendous benefit.

SUMMARY OF THE INVENTION

The present invention is directed toward methods of crosslinking carbon nanotubes to each other, articles of manufacture produced by such methods, compositions produced by such methods, and applications for such compositions and articles of manufacture.

In some embodiments of the present invention, microwave radiation is used to crosslink or fuse carbon nanotubes together. In some embodiments, this provides for larger bundles or ropes of carbon nanotubes, and ropes where many of the strands are fused together. In some embodiments, this provides for "welded" nanotube junctions. In some embodiments, this provides for macroscopic objects. In some embodiments, blocks comprising a particular type of carbon nanotube, for example single-wall carbon nanotube "bucky-rocks," (formations of all or predominantly nanotubes) are exposed to microwave radiation such that they are joined together via carbon nanotube crosslinking at surface or edge regions of the blocks or throughout the blocks. See commonly-assigned, co-pending U.S. patent application Ser. No. 10/391,988, filed Mar. 19, 2003 (Smalley et al., Pub. No. US 2003/0211028 A1).

The present invention is also directed toward methods of radiatively modifying composites and/or blends comprising carbon nanotubes with microwaves that interact with said carbon nanotubes to induce modifications, and to the compositions produced by such methods. Such composite and/or blend materials generally comprise either a polymeric or ceramic host material into which are incorporated carbon nanotubes. The modifications can come via actual covalent bond crosslinks between the tubes and the composite host, and/or nanotube/microwave-induced localized heating of the composite material to cause modifications of the host matrix via crosslinking within the host or bond cleavage within the host.

In some embodiments, a polymeric host is used such that the composite and/or blend is a carbon nanotube-polymer composite and/or blend, and the modification comprises either a curing process and/or a crosslinking process, wherein the carbon nanotubes serve as a conduit for thermally and/or photolytically curing and/or crosslinking the host matrix with microwave radiation. In some such embodiments, appropriately-functionalized carbon nanotubes are crosslinked to the polymer host when irradiated with microwaves. In some such embodiments, carbon nanotubes are used as a laminating agent. In some embodiments, carbon nanotubes within said carbon nanotube-polymer composites and/or blends are crosslinked to themselves when the polymer host matrix can survive the thermal heating such processes can generate.

In some embodiments, a ceramic host material or carbon/carbon composite (sometimes referred to, in the unfinished state, as pre-pregs) is used such that the composite and/or blend is a carbon nanotube-ceramic composite and/or blend or a carbon nanotube-carbon/carbon composite and/or blend. Carbon nanotubes dispersed in such a ceramic or carbon/carbon matrix can be used to thermally sinter and/or drive off binding agents in the composite and/or blend when exposed to microwave radiation. In some embodiments, carbon nanotubes are crosslinked within ceramic, glass or carbon/carbon matrices with microwaves.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
FIG. 1 depicts SWNTs in a UHV tube suspended above (~8 cm) an active microwave source showing white light emission in the absence of room light.

The present invention is directed toward methods that exploit the interaction of microwaves with carbon nanotubes and to the compositions and articles of manufacture produced by such methods.

Carbon nanotubes, according to the present invention, can be made by any known technique (e.g., arc method, laser oven, chemical vapor deposition, flames, HiPco, etc.) and can be in a variety of forms, e.g., soot, powder, fibers, "bucky papers," etc. Such carbon nanotubes include, but are not limited to, single-wall carbon nanotubes, multi-wall carbon nanotubes, double-wall carbon nanotubes, buckytubes, fullerene tubes, carbon fibrils, carbon nanotubules, stacked cones, horns, carbon nanofibers, vapor-grown carbon fibers, and combination thereof. They may comprise a variety of lengths, diameters, chiralities (helicities), number of walls, and they may be either open or capped at their ends. Furthermore, they may be chemically functionalized in a variety of manners. These could include semiconducting (bandgaps ~1-2 eV), semimetallic (bandgaps ~0.001-0.01 eV) or metallic carbon nanotubes (bandgaps ~0 eV), and more particularly mixtures of the three types.

Chemically functionalized carbon nanotubes, according to the present invention, comprise the chemical modification of any of the above-described carbon nanotubes. Such modifications can involve the nanotube ends, sidewalls, or both. Chemical modification, according to the present invention, includes, but is not limited to, covalent bonding, ionic bonding, chemisorption, intercalation, surfactant interactions, polymer wrapping, cutting, solvation, and combinations thereof. For some exemplary kinds of chemical modifications, see Liu et al., "Fullerene Pipes," Science, 280, pp. 1253-1256 (1998); Chen et al., "Solution Properties of Single-Walled Carbon nanotubes," Science, 282, pp. 95-98 (1998); Khabashesku et al., "Fluorination of Single-Wall Carbon Nanotubes and Subsequent Derivatization Reactions," Acc. Chem. Res., 35, pp. 1087-1095 (2002); Sun et al., "Functionalized Carbon Nanotubes: Properties and Applications," Acc. Chem. Res., 35, pp. 1096-1104 (2002); Holzinger et al., "Sidewall Functionalization of Carbon Nanotubes," Angew. Chem. Int. Ed., 40(21), pp. 4002-4005 (2001); Bahr et al., "Covalent chemistry of single-wall carbon nanotubes," J. Mater. Chem., 12, pp. 1952-1958 (2002); Gu et al., "Cutting Single-Wall Carbon Nanotubes through Fluorination," Nano Letters, 2(9), pp. 1009-1013 (2002), O' Connell et al., "Reversible water-solubilization of single-walled carbon nanotubes by polymer wrapping," Chem. Phys. Lett., 342, pp. 265-271 (2001), Dyke et al., "Solvent-Free Functionalization of Carbon Nanotubes," J. Am. Chem. Soc., 125, pp. 1156-1157 (2003), Dyke et al., "Unbundled and Highly Functionalized Carbon Nanotubes from Aqueous Reactions," Nano Lett., 3, pp. 1215-1218 (2003). In some cases, when microwaves interact with functionalized carbon nanotubes, some or all of the functionalization moieties can be lost.

Carbon nanotubes of the present invention can also be physically modified by techniques including, but not limited to, physisorption, plasma treatment, radiation treatment, heat treatment, pressure treatment, and combinations thereof, prior to being treated according to the methods of the present invention. In some embodiments of the present invention, carbon nanotubes have been both chemically and physically modified, prior to being treated according to the methods of the present invention.

Carbon nanotubes, according to the present invention, can be in their raw, as-produced form, or they can be purified by a purification technique. Furthermore, mixtures of raw and purified carbon nanotubes may be used. For some exemplary methods of carbon nanotube purification, see Rinzler et al., "Large-Scale Purification of Single-Walled Carbon Nanotubes: Process, Product, and Characterization," Appl. Phys. A, 67, pp. 29-37 (1998); Zimmerman et al., "Gas-Phase Purification of Single-Wall Carbon Nanotubes," Chem. Mater., 12(5), pp. 1361-1366 (2000); Chiang et al., "Purification and Characterization of Single-Wall Carbon nanotubes," J. Phys. Chem. B, 105, pp. 1157-1161 (2001); Chiang et al., "Purification and Characterization of Single-Wall Carbon Nanotubes (SWNTs) Obtained from the Gas-Phase Decomposition of CO (HiPco Process)," J. Phys. Chem. B, 105, pp. 8297-8301 (2001).

In some embodiments of the present invention, the carbon nanotubes may be separated on the basis of a property selected from the group consisting of length, diameter, chirality, electrical conductivity, number of walls, and combinations thereof, prior to being treated according to the methods of the present invention. See Farkas et al., "Length sorting cut single wall carbon nanotubes by high performance liquid chromatography," Chem. Phys. Lett., 363, pp. 111-116 (2002); Chattopadhyay et al., "A Route for Bulk Separation of Semiconducting from Metallic Single-Wall Carbon nanotubes," J. Am. Chem. Soc., 125, 3370-3375 (2003); Bachilo et al., "Structure-Assigned Optical Spectra of Single-Walled Carbon Nanotubes," Science, 298, 2361-2366 (2002); Strano et al., "Electronic Structure Control of Single Walled Carbon Nanotube Functionalization," Science, 301, pp. 1519-1522 (2003).

Irradiating Carbon Nanotubes with Microwave Radiation

Applicants have shown that carbon nanotubes interact strongly with microwave radiation. See Imholt et al., "Nanotubes in Microwave Fields: Light Emission, Intense Heat, Outgassing, and Reconstruction," Chem. Mater., 15, pp. 3969-3970 (2003). Carbon nanotubes display strong microwave absorption with subsequent light emission and heat release. For example, when single-wall carbon nanotubes are irradiated in an ultra-high vacuum environment with 2.45 GHz microwaves using a 700 W magnetron source, light is emitted in wavelengths which range from the infrared through the ultraviolet regions of the electromagnetic spectrum and temperatures as high as 2000° C. are observed. Though carbon nanotubes tend to burn when irradiated with microwaves in an oxidizing environment (e.g., air), when done in an inert environment, the irradiation can yield new materials and the emitted light and/or heat can be harnessed in other processes.

Crosslinking Carbon Nanotubes with Microwave Radiation

The present invention is directed toward methods of crosslinking carbon nanotubes to each other, articles of manufacture produced by such methods, compositions produced by such methods, and applications for such compositions and articles of manufacture.

In some embodiments of the present invention, microwave radiation is used to crosslink carbon nanotubes together. Such crosslinking is typically generated between sidewalls of adjacent carbon nanotubes, but does not preclude interactions between the ends of carbon nanotubes aligned in series. Such crosslinking generally comprises covalent carbon-carbon bonds, but may alternatively or additionally comprise other types of covalent bonds, particularly when the carbon nanotubes are chemically modified with functional moieties.

In some embodiments of the present invention, carbon nanotubes are fused or "welded" together such that there is a junction formed at the intersection of one nanotube end and the sidewall of another nanotube. Such fusing or welding represents a special kind of crosslinking wherein carbon atoms within the fused nanotubes are required to undergo rearrangement.

In some embodiments, the crosslinking provides for larger bundles or ropes of carbon nanotubes. In some embodiments, this provides for macroscopic objects. In some embodiments, blocks or panels (approx. 1"×1" by ¼" thick, but a variety of dimensions could be used) comprising a particular type of carbon nanotube, single-wall carbon nanotube "buckyrocks," are exposed to microwave radiation such that they are joined together via carbon nanotube crosslinking at surface or edge regions of the blocks or panels. See commonly-assigned, co-pending U.S. patent application Ser. No. 10/391,988, filed Mar. 19, 2003 (Smalley et al., Pub. No. US 2003/0211028 A1). The technique could be used on nanotube fibers for fusing the individual nanotube strands to each other within the fiber. For nanotube fibers, see commonly-assigned, co-pending U.S. patent application Ser. No. 60/511,285, filed Oct. 14, 2003 (Ericson et al.) and Davis et al., "Phase Behavior and Rheology of SWNTs in Superacids," Macromolecules, 2003, both of which are incorporated by reference herein.

The extent of crosslinking can have a profound effect on the properties of the resulting material and is, therefore, highly application-dependent. In some embodiments, only minimal crosslinking is induced as needed. In other embodiments, a moderate or substantial amount of crosslinking is generated, as required.

To generate the above-described crosslinking, the carbon nanotubes must be irradiated with microwave radiation in a crosslinking irradiation process. Such radiation can be of a discrete frequency or a range of frequencies. Such radiation typically comprises a frequency in the range of about 0.01 to about 50 GHz, and more particularly 1-18 GHz. Such radiation is typically generated by a magnetron in an irradiating environment. Irradiations typically involve a power output of between about 2 W for localized heating and about 100-1000 W for nanotube welding, wherein such power output is constant, variable, or both, during the irradiation cycle. Irradiation cycles typically range in duration from about 0.1 second to about 10 min, depending on the application and power. Irradiation processes, according to the present invention, can comprise one or more irradiation cycles of the same or varying (slowly increasing or slowly decreasing) power.

Applicants have observed that when carbon nanotubes are irradiated with microwaves in an oxidative environment—they burn. See Imholt et al., Chem. Mater., 15, pp. 3969-3970 (2003). Typically, the radiation environment used for crosslinking carbon nanotubes comprises a vacuum environment. In some embodiments, this vacuum environment is an ultra-high vacuum (UHV) environment. UHV, according to the present invention is $<10^{-7}$ torr; high vacuum is $10^{-3}$ to $10^{-7}$ torr and partial vacuum is $>10^{-3}$ to <1 torr.

In some embodiments of the present invention, the radiation environment used for crosslinking carbon nanotubes comprises an inert atmosphere. The inert atmosphere may be overpressured or underpressured (reduced pressure) relative to atmospheric pressure. Inert atmospheres include, but are not limited to, helium, argon, krypton, dinitrogen, and combinations thereof, so as to minimize or mitigate oxidative decomposition of the carbon nanotube. In some applications an oxygen atmosphere may be desired, at 1 atm or less, to induce partial oxidative degradation.

In some embodiments of the present invention, the radiation environment used for crosslinking carbon nanotubes comprises an inert atmosphere that becomes reactive upon irradiation with microwaves. Examples of such environments include, but are not limited to, $CF_4$, $CO_2$, $SF_6$, and combinations thereof.

In some embodiments, the radiation environment used for crosslinking carbon nanotubes comprises a small amount of a reactive gas, e.g., generally a partial pressure less than about 100 torr, and more typically less than about 1 torr.

In some embodiments, the radiation environment used for crosslinking carbon nanotubes is static, whereas in other embodiments it varies. Such variation can comprise any of the above-mentioned environments.

In some embodiments, the present invention is directed toward compositions and articles of manufacture comprising the crosslinked carbon nanotubes of the present invention. Some of these compositions—as well as articles of manufacture generated from them—comprise solely crosslinked carbon nanotubes. In some embodiments, such compositions and articles of manufacture comprise solely carbon nanotubes, but wherein only a portion are crosslinked. The properties of such compositions can vary considerably, depending on the types of nanotubes making up the composition and/or article of manufacture, or the degree of crosslinking based on microwave exposure.

In some embodiments, the compositions and articles of manufacture comprising crosslinked carbon nanotubes are composite or blended species further comprising a host material. Host materials, according to the present invention include, but are not limited to, polymeric species, metals, semiconductor materials, alloys, ceramics, glasses, carbon/carbon composites, pre-pregs, and combinations thereof. Incorporation of such crosslinked carbon nanotubes into a host material can impart desirable properties to the resulting composite and/or blend.

Applications for compositions of the present invention that comprise crosslinked carbon nanotubes include, but are not limited to, building materials, structural materials, aerospace materials, medical devices, military applications, law enforcement applications, composites, articles of manufacture, sensor devices, electronic array devices, wires, and combinations thereof. In one exemplary embodiment, small buckyrock blocks or panels are crosslinked (fused) at their edges or throughout to form an essentially two-dimensional array of such blocks or panels. This array can then be used as armor to shield individuals from bullets (e.g., a bullet-proof vest) or other projectiles.

Composites and/or Blends Comprising Carbon Nanotubes

The present invention is also directed toward methods of radiatively modifying composites and/or blends comprising carbon nanotubes, with microwaves, and to the compositions produced by such methods. Such methods take advantage of the ability of carbon nanotubes to channel microwave radiation into light and/or thermal emission capable of inducing modification.

Composites and/or blends comprising carbon nanotubes, according to the present invention, generally comprise carbon nanotubes dispersed in a host matrix. Suitable host matrices include, but are not limited to, polymeric species, ceramic species, and combinations thereof. Exemplary polymeric species include, but are no limited to, species which undergo thermally-induced crosslinking, photolytically-induced crosslinking, species which require thermal curing, species which require photolytically-induced curing, and combinations thereof The present invention provides for methods of selectively-modifying certain regions of a composite and/or blend material comprising carbon nanotubes when the material is irradiated with microwaves. This is accomplished by focusing microwave radiation only on regions of the material where modifications are desired.

Carbon nanotubes have been shown to emit light (particularly visible and ultra-violet light) and heat when irradiated with microwave radiation. See Imholt et al., Chem. Mater., 15, pp. 3969-3970 (2003). Thus, carbon nanotubes can serve as a conduit for thermally- or photolytically-induced modification of a composite and/or blend material in which they reside—when they are exposed to microwave radiation.

To generate the above-described modifications, the composites and/or blends comprising the carbon nanotubes must be irradiated with microwave radiation in an irradiation process. Such radiation can be of a discrete frequency or a range of frequencies. Such radiation typically comprises a frequency in the range of about 0.01 to about 50 GHz, and more particularly 1-18 GHz. Such radiation is typically generated by a magnetron in an irradiating environment. Irradiations typically involve a power output of between about 2 W for localized heating and about 100-1000 W for nanotube welding, wherein such power output is constant, variable, or both, during the irradiation cycle. Irradiation cycles typically range in duration from about 0.1 second to about 10 minutes, depending on the application and power. Irradiation processes, according to the present invention, can comprise one or more irradiation cycles.

The irradiation processes used to induce modifications in composites and/or blends comprising carbon nanotubes are done in a radiation-modifying environment. Such a radiation-modifying environment can, in some embodiments, be a vacuum environment. In some embodiments, the radiation-modifying environment comprises an inert gas. In some embodiments, the radiation-modifying environment comprises a reactive species, or an inert species that becomes reactive upon microwave irradiation.

The amount of carbon nanotubes incorporated into a host material varies widely depending on the application. Generally, the weight percent of carbon nanotubes (relative to the total weight of the composite and/or blend) ranges from about 0.01 wt % to about 90 wt %, and more specifically from about 0.1 wt % to about 10 wt %.

In some embodiments, carbon nanotubes are blended with a polymeric species comprising thermally- and/or photolytically-activated functional groups capable of undergoing crosslinking. Such carbon nanotube-polymer blends are modified when irradiated with microwave radiation. Microwave radiation heats the carbon nanotubes dispersed throughout the polymeric host causing the polymeric host to undergo thermally-induced crosslinking. The carbon nanotubes can further emit electromagnetic radiation capable of photolytically-inducing crosslinking mechanisms. Polymers suitable for use in such embodiments sometimes include species with regions of unsaturation. Exemplary polymeric species include, but are not limited to, polystyrene, acrylonitrile-butadiene-styrene (ABS), polybutadiene, polyisoprene and polycarbonates. Often, one can have a photo-induced crosslinking additive in the polymer such that upon exposure to the nanotube/microwave-induced light, the additive affords a radical or acid or other crosslink agent which induces the crosslinking. Similarly, one can have a thermal-generated crosslinking additive in the polymer such that upon exposure to the nanotube/microwave-induced light, the additive affords a radical or acid or other crosslink agent which induces the crosslinking.

When carbon nanotube-polymer blends comprise chemically functionalized carbon nanotubes with appropriate functional groups, microwave radiation can induce crosslinking reactions between the carbon nanotubes and the polymer host.

In some embodiments, carbon nanotubes are incorporated into polymer hosts by first mixing them with monomer precursors, then polymerizing the monomers in the presence of the carbon nanotubes. In some embodiments, carbon nanotubes can serve as a source for thermally- or photolytically-induced polymerization—when exposed to microwave radiation and when done in the presence of a suitable initiator.

In some embodiments, carbon nanotubes incorporated into a polymeric host can serve as a conduit for thermally- or photolytically-induced curing—when exposed to microwave radiation. In such embodiments, carbon nanotubes are dispersed into the polymeric precursors or the polymer in its uncured state. Curing is then initiated (or accelerated) by exposure to microwave radiation. Exemplary polymeric species capable of being cured in such a manner include, but are not limited to, silicones, epoxies, polycarbonates, ceramics, glasses, carbon/carbon composites, and combinations thereof.

In some embodiments, carbon nanotubes are used as a laminating or gluing agent. In such embodiments, carbon nanotubes are placed between two polymeric sheets or tiles or other materials. Upon irradiating with microwave radiation, the sheets are fused together via crosslinking and/or curing mechanisms induced by the carbon nanotubes upon being irradiated with microwaves. This could further be done as a carbon nanotube/polymer blend between the two sheets or tiles.

In some embodiments, carbon nanotubes are incorporated into ceramic host materials. In some embodiments, such incorporation is accomplished by the steps of: 1) forming a slurry of ceramic particles, 2) mixing carbon nanotubes into the slurry, 3) adding suitable binding agents, 4) shape-forming the slurry, 5) heating to eliminate the binding agent, and 6) sintering the final product. Microwave irradiation after the shape-forming step could serve to eliminate the binding agent and/or sinter the final product. Other methods of incorporating carbon nanotubes include dispersal in a ceramic sol-gel, followed by shape forming and microwave-induced sintering via the incorporated carbon nanotubes. Exemplary ceramics include, but are not limited to, $ZnO$, $CeO_2$, $Al_2O_3$, $SiO_2$, $TiO_2$, and combinations thereof.

For composites and/or blended materials comprising carbon nanotubes, microwave radiation generally causes the carbon nanotubes to thermally- or photolytically-induce modifications in the host material. However, in some embodiments, carbon nanotubes within composite and/or blend can be crosslinked to themselves when the host matrix can survive the thermal heating such processes can generate. This is more relevant for ceramic host materials and does not preclude modifications to the host material as well.

The methods described above have numerous applications. In addition to the compositions made by such methods, using carbon nanotubes to channel energy into composite or blended systems provides the ability to selectively cure/crosslink/sinter in a remote fashion in environments where traditional methods for doing this would fail. And since microwaves generally have very good depth of penetration in these materials, thorough and more homogeneous curing can be expected than for that generated by traditional photocuring methods alone.

The present invention is also directed to novel articles of manufacture produced by the above-described methods and comprising carbon nanotubes in a polymer or ceramic host, wherein the host material is selectively altered in desired regions by microwave-induced thermal or photolytic emissions form carbon nanotubes with the host matrix. This would leave, for example, a large section of material with differing levels of modulus (stiffness) at differing locations.

The following examples are included to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLES

Example 1

This Example serves to illustrate embodiments in which single-wall carbon nanotubes (SWNTs), produced via the HiPco process [Nikolaev et al., "Gas-Phase Catalytic Growth of Single-Walled Carbon Nanotubes from Carbon Monoxide," Chem. Phys. Lett., 313, pp. 91-97 (1999)] display strong microwave absorption ($1.01 \times 10^{-5}$ eV microwave field) with subsequent dramatic light emission, intense heat release, outgassing, and nanotube reconstruction.

The microwave source used for this Example was a 700 W magnetron at 2.45 GHz. single-wall carbon nanotubes were tested in both purified [Chiang et al., J. Phys. Chem. B, 105, pp. 8297-8301 (2001)] and raw conditions (directly from the HiPco reactor). All visual reactions took place approximately 1 second after application of the microwave field. Laser-oven-produced single-wall carbon nanotubes were also tested, but effects were less dramatic. This might be due to increased average diameters of the single-wall carbon nanotubes in the laser-oven materials or differing percentages of (a) metallic to semiconducting tubes, (b) iron seed particles at the ends of the tubes, or (c) defects in the tubes.

In air and under application of the microwave field, unpurified HiPco single-wall carbon nanotubes ignited and burned. Interestingly, we observed that a magnifying glass and sunlight can also cause the raw HiPco tubes to rapidly ignite and burn. The regions of the single-wall carbon nanotubes that underwent this process showed a permanent color change to orange. These orange regions fluoresce under normal room light. A transmission electron microscope (TEM)-generated image of these orange regions shows a change to amorphous carbon structures that are 50-500 nm in diameter with little discernable tube structures. Powder X-ray diffraction analysis on the orange material confirmed the presence of hematite. The purified nanotubes, when in the presence of the microwave field in air, only display random scintillations of white light.

Both the raw and purified nanotubes, when placed under UHV in the presence of the microwave field, emitted white light as shown in FIG. 1. The process could be repeated with no observable degradation of the light intensity over ~20 s of microwave irradiation. After minutes of constant exposure, there was a diminution of light, though they were still light-emitting. Short exposure pulses (~3-5 s) could be repeated with no obvious degradation over the 35 pulses attempted.

Figure 2A:
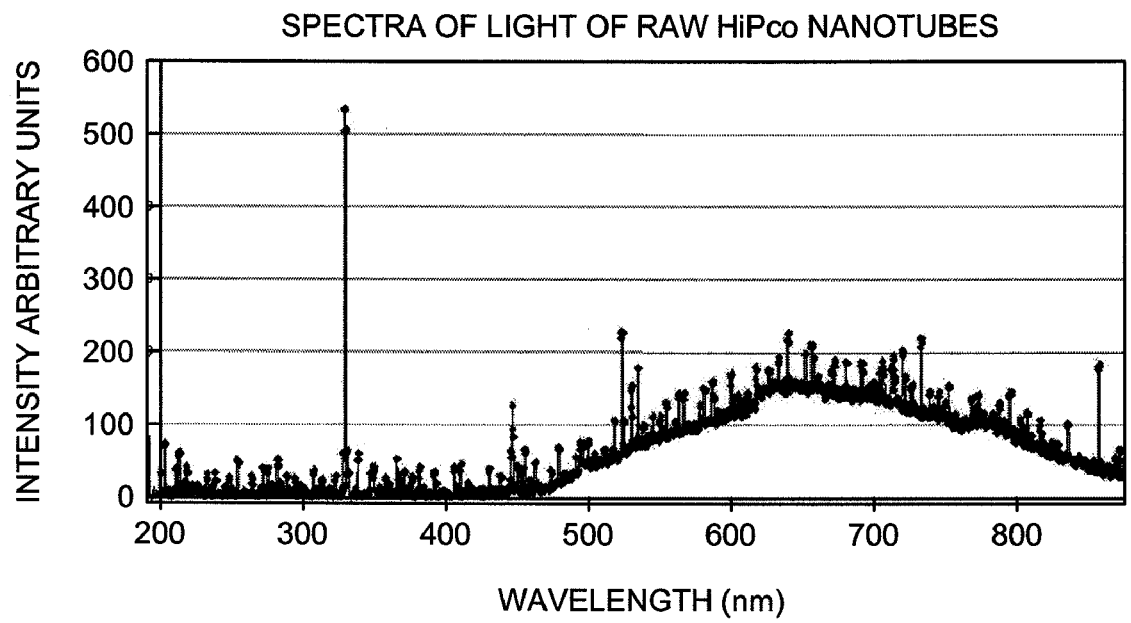
FIG. 2 depicts an emission spectrum of light from (A) raw and (B) purified SWNTs when subjected to the microwave irradiation. The background spectrum showed no peaks.
Figure 2B:
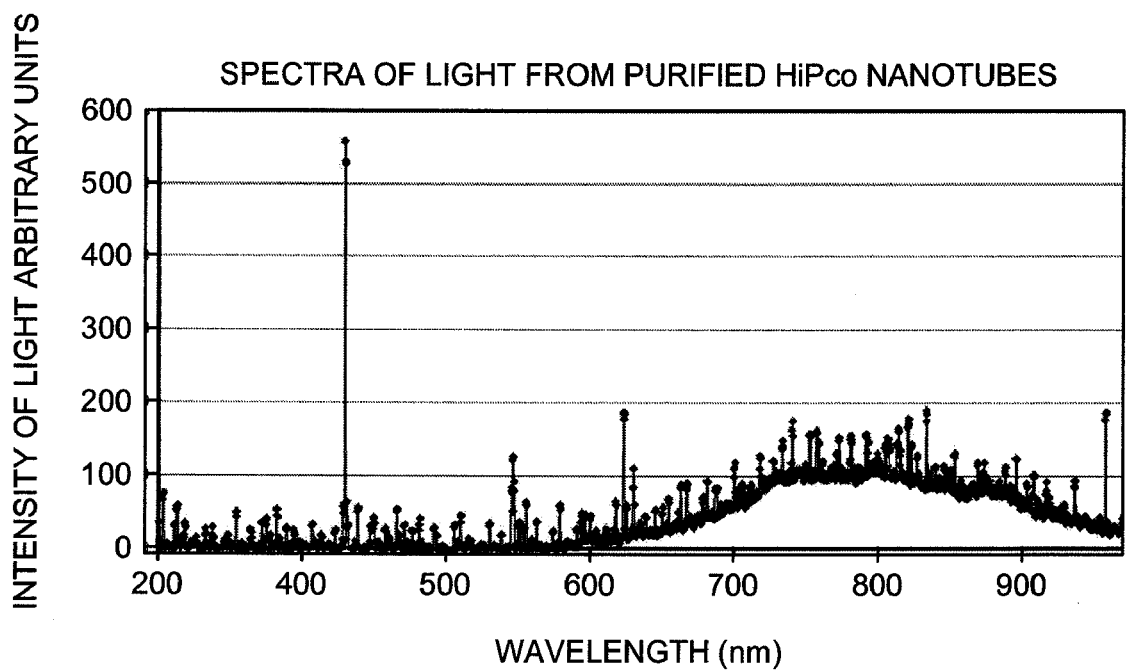

The light emission spectra in this experiment were taken with a fiber optic spectrometer with collimating lens for increased sensitivity. These emissions extend from the infrared (IR) through visible and into the ultraviolet (UV) regions of the electromagnetic spectrum as shown in FIG. 2. The majority of the broadband emissions are in the visible and near-infrared (NIR) regions with the UV components consisting mainly of spikes corresponding to known atomic emissions assigned to carbon (~330 nm), iron (the catalyst used in the HiPco process), or hydrogen. See FIG. 2. Although the light emission could be from a frequency up-conversion, it is more likely due to a broad-band photon emission from the hot tubes (vide infra). Light emissions from carbon nanostructures, such as $C_{60}$, have been observed. See Palstra et al., "Electric current induced light emission from $C_{60}$," Carbon, 35, pp. 1825-1831 (1997).

Figure 3:
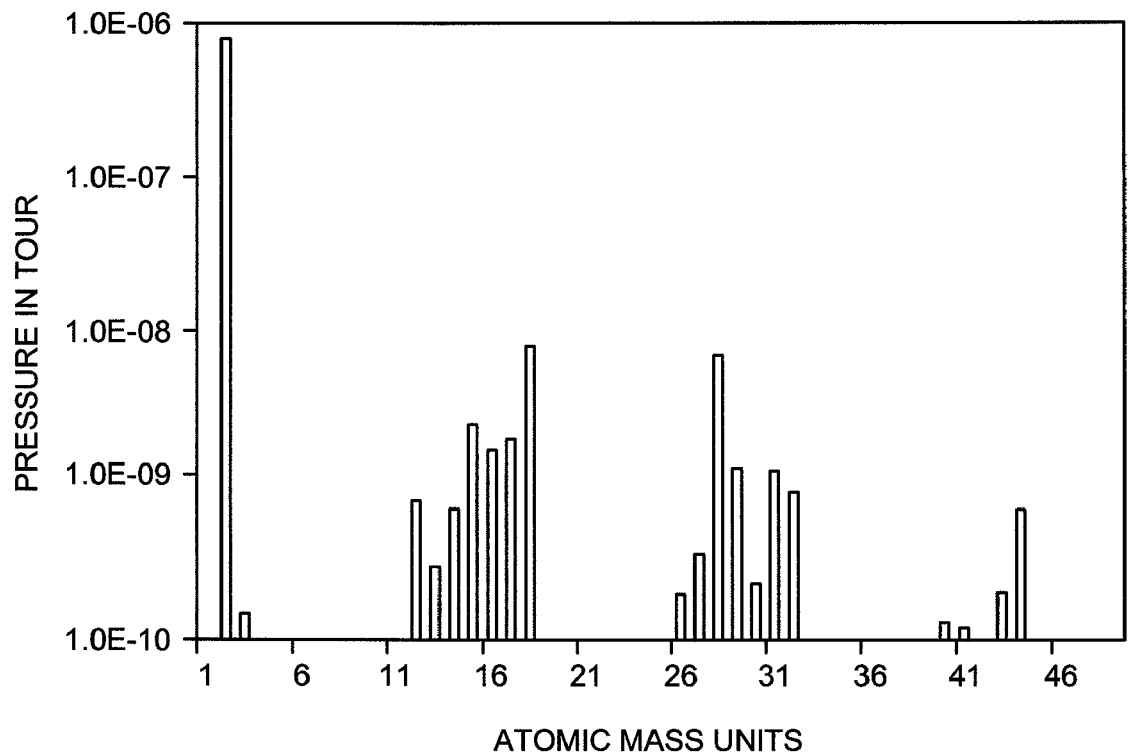
FIG. 3 depicts the residual gas analysis (RGA run on a Dycor LC200). Shown are the masses (amu) of the species evolved from the UHV tube upon microwave irradiation with a large initial peak from $H_2$ (2 amu). Trace background constituents of the vacuum system (recorded prior to opening the nanotube sample to the vacuum system) were subtracted out of this spectrum.

The light emission under UHV conditions is accompanied by out-gassing in both the crude and purified tubes. The expelled gas, seen after several seconds of application of the microwave field, was observed in a residual gas analyzer (RGA). FIG. 3 illustrates a residual gas analysis plot wherein the larger the bar, the more there is of a particular species. Nanotubes are known to absorb hydrogen [Pradhan et al., "Large cryogenic storage of hydrogen in carbon nanotubes at low pressures," J. Mater. Res., 17, pp. 2209-2216 (2002); Ma et al., "Hydrogen storage capacity in single-walled carbon nanotubes," Phys. Rev. B., 65, #155430 (6 pages) (2002); Gundiah et al., "Hydrogen storage in carbon nanotubes and related materials," J. Mater. Chem., 13, pp. 209-213 (2003); Gordillo et al., "Zero-Temperature Equation of State of Quasi-One-Dimensional $H_2$," Phys. Rev. Lett., 85, pp. 2348-2251 (2000)] therefore it is assumed that its presence was from adventitious hydrogen present in the laboratory environment or as a pyrolyzate from absorbed organics such as solvent or pump oil. But there is clearly nanotube breakdown at the higher temperatures and prolonged (seconds) exposure times.

In addition to the light emission and out-gassing, the microwave irradiation of the samples was accompanied by rapid temperature increase in the sample. The temperatures here exceed those commonly observed by microwave superheating. See Baghurst et al., "Superheating Effects Associated with Microwave Dielectric Heating," J. Chem. Soc., Chem. Commun., 6, p. 674 (1992). Pyrometer measurements showed temperatures reaching 2000° C., and upon removal of the microwave field a thermocouple was immediately attached to the quartz vessel and a temperature of 1550° C. was observed.

Figure 4:
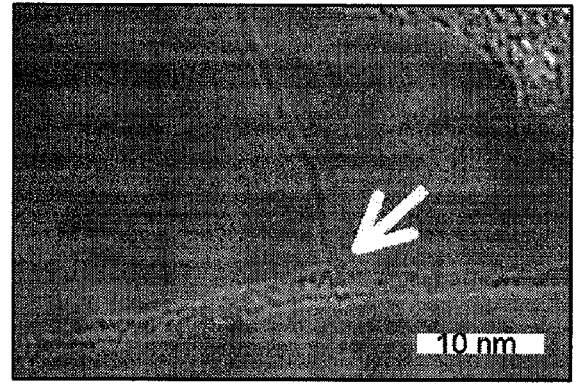
FIG. 4 depicts a TEM image of fused nanotubes after microwave irradiation, the region being merely one of numerous such regions observed in the irradiated samples.
Figure 5:
FIG. 5 depicts a TEM image showing looped nanotubes after microwave irradiation, the region being merely one of numerous such regions observed in the irradiated samples.

The heat release, light emission and gas evolution were further accompanied by the nanotube samples undergoing intense mechanical motion. The initial nanotube material spreads to about twice its original volume when the microwave field is applied, and when the microwave field is turned off, the sample contracts back to its near-original size. This occurs in a repeatable manner upon the short exposure cycles. Repeated exposure caused a decrease in the observed mechanical motion presumably from crosslinking or welding of the tubes. See Terrones et al., "Molecular Junctions by Joining Single-Walled Carbon Nanotubes," Phys. Rev. Lett., 89, #075505 (2002); Tsai et al., "The welding of carbon nanotubes," Carbon, 38 (13), pp. 1899-1902 (2000); Baughman et al., Science, 297, pp. 787-792 (2002); Zhao et al., "Dynamic Topology of Fullerene Coalescence," Phys. Rev. Lett., 88, #185501 (2002); Zhao et al., "Coalescence of fullerene cages: Topology, energetics, and molecular dynamics simulation," Phys. Rev. B, 66, #195409 (9 pages) (2002). Indeed, TEM imaging of the nanotubes after extended microwave irradiation in UHV showed that many of the nanotubes fused (welded) into neighboring tubes to form junctions. The well-defined junction formations can be seen in FIG. 4 and it is very similar in configuration to theoretical models [Zhao et al., Phys. Rev. Lett., 88, #185501 (2002)]. This might prove to be an efficient means of welding nanotubes or nanotube-based ropes. See Jiang et al., "Spinning continuous carbon nanotube yarns," Nature, 419, p. 801 (2002)] after dispersion in blends or composites [Mitchell et al., "Dispersion of Functionalized Carbon Nanotubes in Polystyrene," Macromolecules, 35, pp. 8825-8830 (2002)], thereby locally increasing the modulus of the microwave-exposed regions. Additionally, formations of looped structures were abundant in the irradiated tubes, as shown in FIG. 5. The welding of single-wall carbon nanotubes requires breaking of carbon-carbon bonds and rearrangement of the carbon atoms. In order for this to take place, temperatures must reach at least 1500° C. [Ajayan et al., Science, 296, p. 705 (2002)], indicative of an efficient absorption of microwaves. Neither welds nor loops are present to this degree in the original HiPco single-wall carbon nanotubes. See Nikolaev et al., Chem. Phys. Lett., 313, pp. 91-97, 1999; Chiang et al., J. Phys. Chem B., 105, pp. 8297-8301 (2001).

Example 2

This Example serves to illustrate how carbon nanotubes can be used as a conduit for the thermal crosslinking of a polymer when exposed to microwave radiation.

To prepare a 3 wt % carbon nanotube-polystyrene blend, approximately 0.12 g of single-wall carbon nanotubes was sonicated in approximately 200 mL of $CHCl_3$ for several minutes. After a sufficient time so as to form a suspension of carbon nanotubes in the $CHCl_3$, the nanotube suspension was added to a solution comprising approximately 4 g of polystyrene in approximately 150 mL of $CHCl_3$. After combination, the resulting mixture was heated to 70° C. to evaporate $CHCl_3$. When the mixture was concentrated down to approximately 150 mL, the solution was placed in a crystallization dish and heated in an oven at 75° C. overnight.

The above blend was then loaded into a cup extruder, heated to 210° C. and extruded into a mold, which had been heated above room temperature (50° C.-80° C.) to keep the blend from cooling down too fast. The molded product was an approximately 2.4 g bar. This bar was then divided into approximately equal halves, one of which was placed in a microwave irradiation chamber. The other half was saved as a control.

The bar placed in the irradiation chamber was irradiated at a frequency of 2.45 GHz at 60 W power for 2 second intervals separated by a 3 second interval at 0 W. Irradiation was stopped after two of these irradiation cycles.

Figure 6:
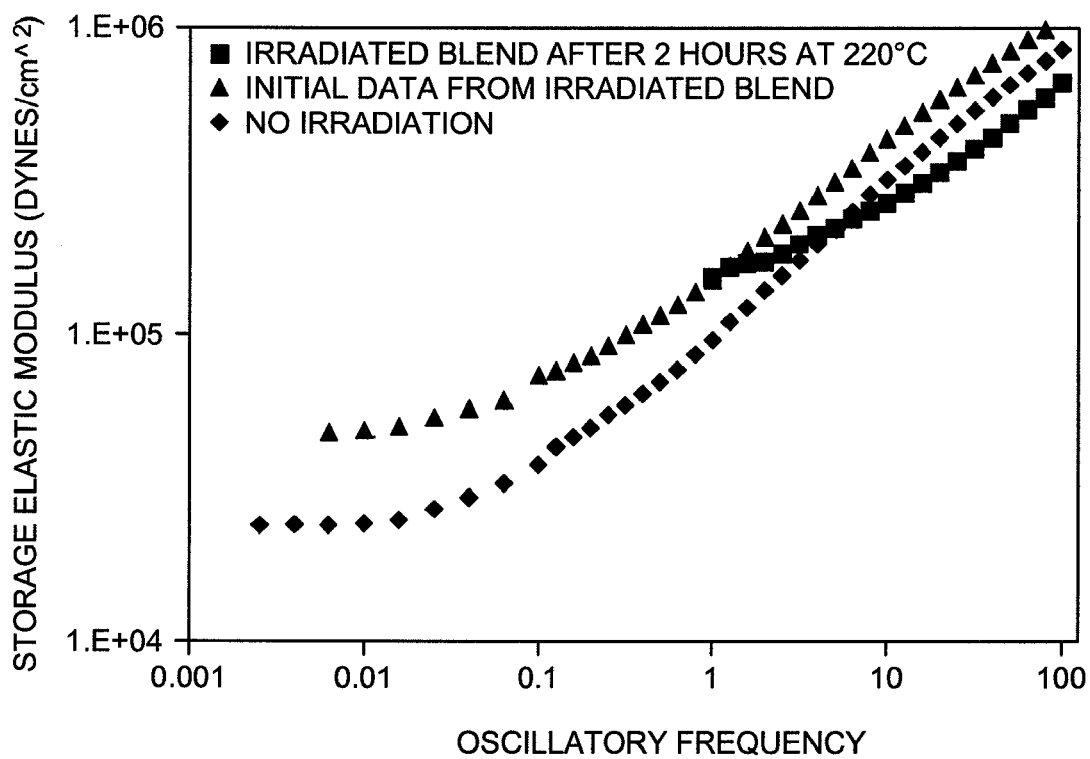
FIG. 6 depicts rheology data for a 3 wt % SWNT/polystyrene blend (♦), an irradiated 3 wt % SWNT/polystyrene blend (▲), and the irradiated 3 wt. % SWNT/polystyrene blend after heating at 220° C. for 2 hours and re-tested (■).

The irradiated bar was observed to increase in stiffness. Rheology studies performed on both the irradiated bar and the control indicate an increase in stiffness of the irradiated bar. Referring to FIG. 6, plots of the storage elastic modulus (dynes/cm$^2$) were plotted versus oscillatory frequency for the control bar (♦) and the irradiated bar (▲). The irradiated bar clearly has a higher storage elastic modulus. While not intending to be bound by theory, it is believed that this increased strength is attributable to polystyrene crosslinking induced by the microwave heating of the carbon nanotubes within the blend. The irradiated bar was subsequently heated at 220° C. for 2 hours and re-tested. The heated irradiated bar (■) was observed to decrease in strength. While not intending to be bound by theory, it is believed that this is a result of degradation caused by reactions involving previously "trapped" free radicals.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising:
   incorporating carbon nanotubes into a host material to form a mixture comprising dispersed carbon nanotubes;

irradiating the dispersed carbon nanotubes in the mixture with microwave radiation;

wherein irradiating the dispersed carbon nanotubes in the mixture with microwave radiation comprises an absorption of microwave radiation by the dispersed carbon nanotubes followed by a thermal emission from the dispersed carbon nanotubes; and wherein the thermal emission from the dispersed carbon nanotubes causes a curing of the host material.

2. The method of claim 1, wherein a weight percentage of the carbon nanotubes ranges from about 0.1% to about 10% of the total weight of the mixture.

3. The method of claim 1, wherein irradiating the carbon nanotubes is performed in an inert environment chosen from the group consisting of ultra-high vacuum, high vacuum, partial vacuum, inert gases, and combinations thereof.

4. The method of claim 1, wherein the host material is thermally curable and is chosen from the group consisting of a polymer precursor, a carbon-carbon composite, and combinations thereof.

5. The method of claim 1, wherein the thermal emission from the carbon nanotubes induces a crosslinking of the host material.

6. The method of claim 1, wherein the thermal emission from the carbon nanotubes causes a crosslinking between the carbon nanotubes and the host material.

7. The method of claim 1, wherein the thermal emission from the carbon nanotubes causes a crosslinking between proximal carbon nanotubes.

8. The method of claim 1, further comprising:
adding an additive to the mixture;
wherein the additive generates radicals or an acid upon exposure to the thermal emission from the carbon nanotubes.

9. The method of claim 1, further comprising:
adding an additive to the mixture;
wherein the carbon nanotubes also emit light upon being irradiated with the microwave radiation; and
wherein the additive generates radicals or an acid upon exposure to the light emitted from the carbon nanotubes.

10. The method of claim 1,
wherein the carbon nanotubes are chemically-functionalized with functional groups before being irradiated.

11. A method comprising:
incorporating carbon nanotubes into a photolytically curable host material to form a mixture comprising dispersed carbon nanotubes; and
irradiating the dispersed carbon nanotubes of the mixture with microwave radiation;
wherein irradiating the dispersed carbon nanotubes comprises an absorption of the microwave radiation by the dispersed carbon nanotubes followed by a light emission from the dispersed carbon nanotubes; and
wherein the light emission from the dispersed carbon nanotubes causes a curing of the host material.

12. The method of claim 11, wherein a weight percentage of the carbon nanotubes ranges from about 0.1% to about 10% of the total weight of the mixture.

13. The method of claim 11, wherein the inert environment is chosen from the group consisting of ultra-high vacuum, high vacuum, partial vacuum, inert gases, and combinations thereof.

14. The method of claim 11, wherein the photolytically curable host material is chosen from the group consisting of a polymer precursor, a carbon-carbon composite, and combinations thereof.

15. The method of claim 11, wherein the light emission from the carbon nanotubes induces a crosslinking of the photolytically curable host material.

16. The method of claim 11, wherein the light emission from the carbon nanotubes causes a crosslinking between the carbon nanotubes and the photolytically curable host material.

17. The method of claim 11, wherein the light emission from the carbon nanotubes causes a crosslinking between proximal carbon nanotubes.

18. The method of claim 11, further comprising:
adding an additive to the mixture;
wherein the additive generates radicals or an acid upon exposure to the light emission from the carbon nanotubes.

19. The method of claim 11,
wherein the carbon nanotubes are chemically-functionalized with functional groups before being irradiated.

20. A method comprising:
dispersing carbon nanotubes between a first polymer sheet and a second polymer sheet comprising a host material; and
fusing the first polymer sheet to the second polymer sheet by microwave irradiation of the dispersed carbon nanotubes;
wherein the microwave irradiation of the dispersed carbon nanotubes comprises:
an absorption of microwave radiation by the dispersed carbon nanotubes followed by a thermal emission from the dispersed carbon nanotubes;
wherein the thermal emission from the dispersed carbon nanotubes causes a curing of the host material.

21. A method comprising:
forming a slurry of particles chosen from the group consisting of ceramics, glasses and combinations thereof;
dispersing carbon nanotubes in the slurry;
adding a binding agent to the slurry;
shape forming the slurry to form a shape formed slurry; and
irradiating the dispersed carbon nanotubes in the shape formed slurry with microwaves to remove a substantial portion of the binding agent;
wherein irradiating the dispersed carbon nanotubes comprises an absorption of the microwaves by the dispersed carbon nanotubes followed by a thermal emission from the dispersed carbon nanotubes.

22. The method of claim 21, wherein the shape formed slurry is further thermally sintered by the thermal emission from the carbon nanotubes.

* * * * *